United States Patent

Beede

[15] 3,635,754

[45] Jan. 18, 1972

[54] ADHESIVE PRODUCT

[72] Inventor: Charles H. Beede, East Brunswick, N.J.

[73] Assignee: Johnson & Johnson

[22] Filed: Feb. 10, 1969

[21] Appl. No.: 798,110

Related U.S. Application Data

[63] Continuation-in-part of Ser. No. 522,037, Jan. 21, 1966, abandoned.

[52] U.S. Cl. ............117/122 H, 117/122 P, 117/122 PA, 117/161 UH, 260/93.7, 260/874, 260/896
[51] Int. Cl. ..................................................C09j 7/04
[58] Field of Search........117/122 H, 122 P, 122 PA, 122 PF, 117/161 UH; 260/874, 93.7, 896

[56] References Cited

UNITED STATES PATENTS

| | | | |
|---|---|---|---|
| 2,778,744 | 1/1957 | Holt | 117/122 X |
| 3,281,375 | 10/1966 | Vandenberg | 260/93.7 |
| 3,296,240 | 1/1967 | MacDonald et al. | 260/93.7 |
| 3,361,727 | 1/1968 | Lutz | 260/93.7 |
| 3,365,436 | 1/1968 | Ourgaud | 260/93.7 |
| 3,367,909 | 2/1968 | Hay et al. | 260/93.7 |
| 3,379,671 | 4/1968 | Coddington et al. | 260/896 |
| 3,395,038 | 7/1968 | Lucchetti | 117/122 |

FOREIGN PATENTS OR APPLICATIONS

| | | |
|---|---|---|
| 979,123 | 1/1965 | Great Britain |

*Primary Examiner*—William D. Martin
*Assistant Examiner*—B. D. Pianalto
*Attorney*—Harold L. Warner, Michael Q. Tatlow and Robert L. Minier

[57] ABSTRACT

Heat-activated temporary pressure-sensitive adhesives are prepared which are activated through heating and on activation take on all of the characteristics of conventional pressure-sensitive adhesives which characteristics they maintain over substantial periods of time after cooling back to their initial temperature prior to the heat activation. The pressure-sensitive adhesives after activation are pressure sensitive in character exhibiting internal strength and the other characteristics of good pressure-sensitive adhesives and in this way they differ substantially from thermoplastic or hot melt adhesives which generally have substantial loss in internal strength becoming stringy and leggy in character when heated to a temperature at which they will bond to other surfaces. The temperature-activated pressure-sensitive adhesives obtain their temperature activation characteristics through the presence of an organic polymer or polymers having in balance at room temperature, prior to heat activation, an ordered or crystalline phase and a disordered or amorphous phase and having a first-order transition temperature or melting point of 35° C. or higher and a second-order transition temperature or glass temperature of 5° C. or lower. The organic polymer or polymers have little to no tack at room temperature and remain in this state until activated by heating and on activation becoming aggressively tacky, exhibiting good pressure-sensitive adhesive characteristics and maintaining such aggressive tackiness and good pressure-sensitive adhesive characteristics for an extended period of time after cooling back to room temperature after which period of time the organic polymer or polymers return to a state of little or no tack.

16 Claims, No Drawings

ADHESIVE PRODUCT

This is a continuation-in-part of application Ser. No. 522,037, filed Jan. 21, 1966 21, 1966 and now abandoned.

The present invention relates to heat-activated pressure-sensitive adhesives and adhesive-coated products made therefrom.

The term "pressure-sensitive adhesives" is generally used to designate adhesive materials which will stick to a surface when pressed against the same by hand pressure and which have sufficient internal strength that the same can be removed from the surface to which they have been adhered without substantial portions of the adhesive separating from the main adhesive mass and remaining on the surface to which the adhesive had been adhered by pressure. Pressure-sensitive adhesives thus differ substantially from sticky materials such, for example, as the adhesives used on flypaper which readily adhere to an object on contact but which have very low internal strength and leave substantial amounts of adhesive on the object when removed. Pressure-sensitive adhesives also differ from thermoplastic or hot melt adhesives which have essentially no adhesive characteristics until heated to their melting or softening point at which temperatures they become extremely tacky and adhere readily to other surfaces on contact but have very little internal strength in such tacky state. They differ further in that they are removable from the applied surface whereas hot melt adhesives are normally used to permanently bond substrates.

Pressure-sensitive adhesives are most commonly used for coating sheet material and the like, for adhering the same to other objects simply by pressing the two into intimate contact. Adhesive tapes are a common example of such use, the pressure-sensitive adhesive being coated onto a flexible backing formed of fabric, film, paper, or the like.

Pressure-sensitive adhesives are most frequently employed where the object to be adhered is to be adhered only for a limited period after which the same is to be removed. Where permanent adherence is required, an adhesive of the nonpressure-sensitive adhesive type is generally employed. However, despite the fact that pressure-sensitive adhesives are frequently used where an object is only to be adhered to another surface for a limited period of time, pressure-sensitive adhesives available have a relatively uniform adhesion level.

One well-known use of pressure-sensitive adhesives, for example, is in the preparation of masking tapes wherein a flexible backing, generally of paper, is coated with a pressure-sensitive adhesive. The tape so prepared in use is applied to an object or surface which is to be protected while adjacent surfaces are being painted. After painting, the tape is then removed from the protected surface. Large quantities of masking tapes are used, for example, in the painting of automobiles and in the painting of homes and other surfaces where it is desired to exclude the paint from specific areas. After painting is completed, the tape must be removed. The adhesion level of the tape, however, is substantially constant so that it must now be stripped from the surface to which it has been applied. Where the surface is relatively fragile as where the surface protected may be wallpaper or a delicate finish, the same can be damaged on removal of the pressure-sensitive adhesive tape because of the continuing tenacious adherence of the pressure-sensitive adhesive to the protected surface. Removal of the tape would be substantially easier and the chance of damage to the underlying surface eliminated if the pressure-sensitive adhesive used would loose its tenacious tack after a predetermined period of time so that the same would no longer adhere strongly to the underlying surface after the period that protection was required, the tape then either falling off or being readily removed from the surface after such period.

Pressure-sensitive adhesive tapes are also widely used for surgical purposes in the taping of patients, athletes, and other persons, and for holding dressings in place. In such use the adhesive of the tape is adhered to the skin of the subject. Substantial discomfort can be experienced when the tape is removed particularly where repeated applications are necessary with the applied area becoming more sensitive with each removal. The tape removal would be substantially less painful and less damaging to underlying skin if the pressure-sensitive adhesive had a substantial decrease in adhesion by the time tape removal was required.

It is an object of the present invention to make pressure-sensitive adhesive products which have limited periods of good adherence to surfaces to which they have been adhered by pressure. It is a further object of the present invention to prepare pressure-sensitive adhesives which normally have little or no tack but which on activation have substantial tack and will adhere to an underlying surface against which the same are pressed for a predetermined period of time after which their degree of adherence is substantially reduced. A still further object is to prepare pressure-sensitive adhesive-coated sheet materials which can be adhered to surfaces for predetermined periods of time after which the adherence to the surface is substantially reduced. Other objects and advantages of this invention will become apparent from the following description taken in connection with the examples given wherein are set forth by way of illustration certain embodiments of this invention.

I have now discovered that heat-activated temporary pressure-sensitive adhesive compositions having controlled time of adhesion can be prepared by preparing organic pressure-sensitive adhesive polymers whose first-order transition temperature or melting point (m.p.) is above 35+ C. and whose second-order transition temperature or glass temperature (Tg) is below 5° C. These adhesive polymers possess at room temperatures both the ordered phase and the disordered phase. The ordered or crystalline phase and disordered or amorphous phase are apparently in balance at room temperature and remain in balance until the adhesive is heated. By room temperature is meant temperatures in the range of about 20° through 30° C. Flexible backings coated with these polymers in normal pressure-sensitive adhesive coating weights have relatively little tack or stickiness after aging but may adhere for brief periods to surfaces when firmly pressed into contact with the same. After being heated, however, to temperatures of about 10° C. above the melting point (first-order transition temperature) of the temporary adhesive polymer, the tack of the coating increases substantially, the coating retaining its high tack and having all of the characteristics of a pressure-sensitive adhesive and maintaining these characteristics for substantial periods after the same has been cooled back to room temperature. The pressure-sensitive adhesive surface will now adhere readily to most surfaces with only light pressure. Also, after adherence to the surface the heat-activated temporary pressure-sensitive adhesive-coated sheet will continue to adhere firmly to the surface for a predetermined length of time after which the degree of adherence is substantially reduced, the adhesion level falling to approximately the same level it possessed prior to heat activation. The adhesive-coated sheet can now be easily removed and, in some instances, may fall away through its own weight. The heat-activated temporary pressure-sensitive adhesive compositions of the present invention thus comprise an organic polymer pressure-sensitive adhesive having in balance at room temperatures both the crystalline phase and the amorphous disordered phase and exhibit a first-order transition temperature of about 35° C. or higher and a second order transition temperature of about 5° C. or lower. The tack of these pressure-sensitive adhesives increases substantially on heating, the increase in tack remaining in the activated temporary pressure-sensitive adhesive for an extended period of time after cooling back to room temperature, and then, after a predetermined time, returning to its initial low level of tack. Although the invention is not limited to any theory of what occurs, it is believed that the ordered or crystalline phase interferes with adhesion. The heating shifts the balance between the crystalline phase and the amorphous phase converting the adhesive polymer over to the amorphous state in which the pressure-sensitive adhesive characteristics of the polymer again become effective.

The presence of the crystalline structure in these temporary heat-activated pressure-sensitive adhesives can be readily determined by X-ray crystallographic analysis. The transition temperatures are determined by differential thermal analysis.

The term "tack" as used in the present specification and claims is used to designate the tacky or sticky nature of the pressure-sensitive adhesive. Tack can be determined by what is generally referred to as the thumb test in which the thumb is pressed against the surface being considered and then removed to determine the tacky or sticky nature of the surface. A substantially more accurate and reproducible test, however, and the one to which the tack values used in the present specification and claims refer is that of F. H. Hammond, Jr., described in Symposium on Recent Developments in Adhesion Science, Special Technical Publication No. 360, published by the American Society for Testing and Materials (1963).

In this test values are given in grams of force required to remove the end of a stainless steel probe, the tip of which comprises a circular surface of 0.25 cm. diameter, from the surface of an adhesive coating at a speed of 1 cm. per second to which it has been adhered for 0.5 seconds at a force of 100 grams. The adhesives of the present invention when measured in this manner show tack values of less than 25 prior to heat activation. However, the tack value of the adhesive increases to above 100 on heat activation and the adhesive retains this high tack for a predetermined period of time after cooling back to room temperature.

Although the invention is not limited to polyolefin pressure-sensitive adhesives but may be practiced through the preparation of other tacky polymeric materials having in balance at room temperature compositions wherein the polymer after aging contains both the ordered or crystalline phase and the amorphous phase and a first-order transition above 35° C. and a second-order transition temperature below 5° C., temporary heat-activated pressure-sensitive adhesives of the present invention are well illustrated by the polyolefin polymers hereinafter more fully described.

Pressure-sensitive adhesive polymers having in balance at room temperatures both the ordered phase and the disordered phase and having a first-order transition temperature of 35° C. or greater and a second-order transition temperature of 5° C. or less can be prepared, for example, entirely from olefins having carbon chains of from two through 16 carbons as long as there is present in the monomer mix a monomer having a carbon chain within the range of 11 through 13 carbons in mol amounts greater than the mol amount of any other monomer present. Thus the polymer may be a homopolymer made entirely of an olefin having a carbon chain within the range of 11 through 13 carbons which can be expressed by the general formula

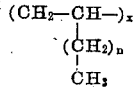

where $n$ is an integer of 8 through 10 or may be a copolymer, terpolymer, or polymer of greater complexity using dissimilar olefin monomers of shorter or longer carbon chain within the range of $C_2$ through $C_{16}$. However, for such more complex polymers, the polymer should have present at least one olefin within the range of $C_{11}$ through $C_{13}$ in amounts greater than any other olefin present although the sum of such other olefins can exceed the amount of the particular olefin of carbon chain length of $C_{11}$ through $C_{13}$.

The polyolefin adhesives are substantially improved where the polymer contains no more than about 30 percent by weight of polymer which is soluble after having been heated at reflux for at least 2 hours in a solvent composed of equal parts of heptane and acetone and cooled for at least 16 hours afterwards.

With the homopolymers the length of the side chain in the olefin polymer has a substantial effect on the homopolymers' physical and adhesive characteristics. Only with side chains of intermediate length, as indicated by the numerical limits given, for $n$, is a pressure-sensitive adhesive olefin polymer mass obtained in which there is a balance between ordered phase and the disordered phase at room temperatures. Above the upper limits given, the resulting polymer has too much of an ordered structure to give pressure-sensitive adhesives having the character described. Also, when the side chains are shorter than the lower limit, too much of the polymer is found to be in the disordered phase at room temperatures while with side chains of $C_3$ or less the polymers again become too ordered. Also, the polymer adhesive in order to have the temporary heat-activated pressure-sensitive adhesive characteristic of converting from essentially a nonadhesive polymer film to a pressure-sensitive and then back to a nontacky film, must have a first-order transition temperature of about 35° C. or higher and a second-order transition temperature of about 5° C. or lower.

In the preferred polyolefin adhesives for making temporary heat-activated pressure-sensitive adhesives where the same is to be spread on a flexible backing as in the making of flexible adhesive sheets, tapes, and the like, the intrinsic viscosity should be within the range of about 2.0 through 3.5. Also, in the preferred temporary heat-activated polyolefin adhesives the soluble polymer content in the heptone-acetone solvent mixture should preferably be no more than about 30 percent of the total polymer content.

The unique characteristic of high tack and holding power obtained over a predetermined period of time through heat activation is well illustrated, for example, in the following table where these characteristics are described for several different polyolefin pressure-sensitive adhesive polymers. The table well illustrates the substantial increase in holding time as well as illustrating the wide range of holding times that can be built into the adhesives through selection of the particular polymer employed.

TABLE I

| Mass system | Transition temperatures, ° C. M.R. | Tg. | Backing | Condition of sample | Tack [1] | Shear adhesion test [2] Load, gms. | Time | Observation |
|---|---|---|---|---|---|---|---|---|
| Poly(dodecene) | 42 | 25 | Vinyl | Aged, no quick-stick | 0 | 500 | 8.95 minutes | Failed. |
| | | | | Activated by heat | 440 | 500 | 113.65 minutes | Do. |
| | | | Taffeta | 10 days old | 0 | 1,000 | 40 seconds | Do. |
| | | | | Activated by heat | 150 | 1,000 | 105 minutes | Do. |
| Copolymer of 10 mol percent decene and 90 mol percent dodecene. | 42 | 37 | Taffeta | Aged | 0 | 200 | <3 seconds | Do. |
| | | | | Activated by heat | 315 | 200 | 4 hours | Has not failed. |
| Terpolymer of dodecene 42.8 mol percent, tetradecene 34.6 mol percent and hexadecene 22.6 mol percent. | 44 | 6 | Terpolymer-taffeta | Aged | 0 | 500 | 1.4 minutes | Failed. |
| | | | | Activated by heat | 340 | 500 | 79.2 minutes | Do. |

[1] Tack: Gms. of force required to remove the end of a stainless steel probe of 0.25 cm. diameter from the mass at a speed of 1 cm. per second to which it had been adhered for 0.5 sec. at a force of 100 gm. measured by a Polyken Probe Tack Tester. Ref.: F. H. Hammond, Jr., Symposium on Recent Developments in Adhesion Science, Special Technical Publication No. 360, published by the American Society for Testing and Materials (1963).
[2] Shear Adhesion Test: The time required to remove a 1" x 3" tape which has an area 1" x 2" adhered to a vertical glass plate by applying a known weight 180° to the adhesive interface.

In the preferred practice of the present invention the backing to which the coating of temporary heat-activated pressure-sensitive adhesive is adhered is an unplasticized backing such as fabric, woven or nonwoven, paper or unplasticized film which may be Mylar, polyethylene or other unplasticized flexible polymer film. Where plasticized vinyl, such as polyvinyl chloride film, is used as the backing there is a tendency for the plasticizer to migrate into the temporary heat-activatable adhesive coating which upsets the crystalline-amorphous balance in the heat-activatable adhesive polymer.

The temporary heat-activated polyolefin pressure-sensitive adhesives can be prepared by a single step process utilizing Ziegler-Natta catalyst systems such, for example, as described in British Pat. Nos. 975,675 and 979,123. In accordance with this process the polymerization is preferably carried out in a saturated hydrocarbon solvent such, for example, as heptane, from which the polymer mass can be spread directly on to a backing and the solvent readily removed.

Care must be taken in carrying out the polymerization if suitable polymers are to be obtained without fractionation. In accordance with my one step process, the catalyst is first prepared by mixing in an inert atmosphere such as nitrogen a compound of a transition element or metal of Groups IV or VIa of the Mendeleff Periodic Table and an organometallic compound of Groups I to III of the Mendeleff Periodic Table. These are mixed in at least 25 mls. of hydrocarbon diluent, in a molar ratio between 1 and 0.20 at $-10°$ to $+187°$ C. (the upper limit is dependent upon the reflux temperature of the solvent). The mixture is then aged for a period of at least 1 minute. The time of aging may be extended to several hours.

The catalyst components are preferably the halides of titanium and the alkyl or alkyl-halide compounds of aluminum. After the aging period, all of the 1-olefin is added, although in the case of a copolymer, the comonomer(s) may be omitted and added later in increments. Additional organometallic compound is added slowly until the final molar amount is equal to 1–10 times the molar amount of the transition element compound. Hydrocarbon diluent is added as needed in order to maintain the viscosity of the reaction mixture in a range where the mixture is easily stirred. The polymerization is run for a period of 8–96 hours, or longer, and is terminated by the addition of 2-propanol, in an amount sufficient to deactivate the catalyst.

Several examples are given in order to further illustrate the preparation of some temporary heat-activated pressure-sensitive adhesives and the manner of handling the same. These examples, however, are given for purposes of illustration only. The invention is not limited thereto, the examples serving only to further illustrate the preparation and use of some illustrative types of temporary heat-activated pressure-sensitive adhesives of the present invention.

EXAMPLE I

Titanium tetrachloride, 2.5 mmoles, is mixed with 2.5 moles of triethylaluminum in 58 ml. of heptane in a 2-liter, multinecked flask, in a nitrogen atmosphere at room temperature, 1-dodecene (168 g., 1 mole) is added 1 hour later. Fifteen minutes after the addition of the dodecene, an additional 5 moles of triethylaluminum in 67 mls. of heptane is added slowly over a 3-hour period and 1,475 ml. of heptane is added during this same period. The polymerization is stopped after 146 hours by the addition of 25 ml. of 2-propanol. There is obtained 140.5 g. (84 percent conversion) of polymer having an intrinsic viscosity of 2.42 and containing 9 percent by weight of polymer soluble in an equivolume mixture of heptane and acetone. The polymer has a first order transition temperature of 42° C., a second order transition temperature of $-25°$ C. and after standing at room temperature for an extended period of time is found to have present both the crystalline phase and the amorphous phase.

A 10 percent solids heptane solution of the polymer is cast on a 2 ml. thick Mylar film using a Gardner knife set at 30 ml. and dried in a steam-heated cabinet for 2 horus. The weight of mass deposited on the backing is about 1.8 oz./yd.[2].

The tape so prepared has the following tack and peel characteristics:

| Hours at Room Temperature After Heating[a] | Tack[b] | Peel Time, Min.[c] |
|---|---|---|
| 0.2 | 400 | 127.4 |
| 6 | 125 | 0.2 |
| 24 | 0 | 0.06 |

[a] Samples heated at 65°–70° C. for at least 30 min.

[b] See footnote (a) of table I.

[c] The time necessary to peel a 1"×2" sample from a glass plate using a load of 27.5 g. applied at 90° to the adhesive interface at the end of a 1 inch tab extending from the plate.

EXAMPLE II

Titanium tetrachloride, 1 mmole, is mixed with 1 mmole of triethylaluminum in 55 ml. of heptane in a 1-liter, multinecked flask, in a nitrogen atmosphere at room temperature. 1-dodecene (84 g., 0.5 mole) is added 1 hour later. Fifteen minutes after the addition of the 1-dodecene, 2 mmoles of triethylaluminum in 60 ml. of heptane are added slowly over a 2-hour period. Heptane (395 ml.) is added slowly, commencing after 1.75 hours of reaction, over a 3-hour period. Ethylene is bubbled into the reaction mixture below the surface of the liquid at a rate of 10 ml. per minute beginning 1.75 hours after the dodecene is added and continuing for 205 minutes. The polymerization is terminated after 24 hours by the addition of 25 ml. of 2-propanol. There is obtained 50.5 g. of polymer (59 percent conversion) having an intrinsic viscosity of 2.70 and containing 6 percent by weight of polymer soluble in an equivolume mixture of heptane and acetone. Gas chromatographic analysis shows that the polymer contains about 9 weight percent ethylene. The polymer has a first-order transition temperature of 45° C., a second-order transition temperature of $-25°$ C. and after standing at room temperature for an extended period of time is found to have present both the crystalline phase and the amorphous phase.

A 10 percent by weight heptane solution of the polymer is drawn down on silicone-coated kraft paper with a Gardner knife set at 30 ml. A rayon taffeta cloth (180"×54") backing is applied and the system dried in a steam-heated cabinet for 2 hours. The weight of mass deposited on the backing is about 1.4 oz./yd.[2].

The tape has the following indicated tack and peel characteristics.

| Hours at Room Temperature After Heating[a] | Tack[b] | Peel Time, Min.[c] |
|---|---|---|
| 0 | 370 | 77.6 |
| 3 | 240 | 60.7 |
| 20 | 5 | 0.1 |

[a] Samples heated at 65°–70° C. for at least 30 min.

[b] See footnote (a) of table I.

[c] See footnote (b) of table in example I.

EXAMPLE III

Titanium tetrachloride, 1 mmole, is mixed with 1 mmole triethylaluminum in 40 mls. of heptane in a 1-liter, multinecked flask, in a nitrogen atmosphere at room temperature, a mixture (76.8 g.) of 1-dodecene (183 mmoles), 1-tetradecene (148 mmoles) and 1-hexadecene (98 mmoles) is added 1 hour later. Fifteen minutes after the addition of the olefin mixture, an additional 4 mmoles of triethylaluminum in 140 mls. of heptane is added slowly over a period of 160 minutes and 575 mls. heptane is added periodically during the first 22 hours of reaction. The polymerization is stopped after 36 hours by the addition of 30 mls. of 2-propanol. There is obtained 36 g. (47 percent conversion) of polymer having an intrinsic viscosity of 2.25 and containing 13 percent by weight of polymer soluble in an equivolume mixture of heptane and acetone. The polymer has a first order transition temperature of 44° C., a second order transition temperature of −6° C. and, after standing at room temperature for an extended period of time, is found to have present both the crystalline phase and the amorphous phase.

A heptane solution of the polymer is drawn down on silicone coated paper using a Gardner knife set at 30 mils. The rayon taffeta backing is applied to the wet film, and the system is dried in a steam-heated cabinet for 2 hours. The weight of mass applied to the backing is about 1.2 oz./yd.².

| Hours at Room Temperature After Heating[a] | Tack[b] | Peel Time, Min.[c] |
|---|---|---|
| 0.2 | 340 | 27.6 |
| 2 | 145 | — |
| >100 | 0 | 1 |

[a] Samples are heated at about 70° C. for at least 30 min.

[b] See footnote (a) of table I.

[c] See footnote (c) of table in example I; the peel weight is 107.5 g.

EXAMPLE IV

Following a polymerization procedure similar to that described in the preceding examples the following polymers are prepared. Pressure-sensitive adhesive tapes are prepared from these polymers using a rayon taffeta cloth backing in a manner similar to that previously described. The tapes are heated to 100° C. for 15 minutes and after heating the polymer coating showed all the properties of a good pressure-sensitive adhesive, the tapes adhering well to the skin. After the time indicated, the pressure-sensitive adhesive qualities were lost, the polymer coatings returning to substantially their initial poor to no tack state.

EXAMPLE IV

TABLE II

| Polymer | Time During Which Pressure-sensitive Adhesive Characteristics Maintained | M.P.°C. | Tg°C. |
|---|---|---|---|
| Polyundecene | 98 hours | 38 | −47 |
| Polydodecene | 12 hours | 43 | −21 |
| Polydecene | Permanent | 23 | −60 |
| Polytridecene | 2 hours | 45 | −12 |
| Copolymer of Dodecene and ethene | 12 hours | 45 | −25 |
| Terpolymer of Dodecene 42.8% Tetradecene 34.6%, and Hexadecene 22.6% | 12 hours | 44 | −6 |

Particular embodiments of the invention have been used to illustrate the same. The invention, however, is not limited to these specific embodiments. In view of the foregoing disclosure, variations and modifications thereof will be apparent, and it is intended to include within the invention all such variations and modifications except as do not come within the scope of the appended claims.

Having thus described my invention, I claim:

1. An article adapted to be adhered through pressure to other surfaces said article having on at least one surface a coating of a heat-activatable pressure-sensitive adhesive organic polymer said polymer having a first-order transition temperatures of no less than 35° C. and a second-order transition temperature of no greater than 5° C. and having in balance at room temperature after prolonged aging and prior to heat activation a crystalline phase and an amorphous phase said organic polymer prior to heat activation having a tack of less than 25 grams of force and after activation by heating having a tack of at least 100 grams of force and exhibiting good pressure-sensitive adhesive characteristics said coating maintaining said increased tack and good pressure-sensitive adhesive characteristics for an extended period of time after cooling back to room temperature after which extended period of time the tack of said adhesive coating decreases to less than 25 grams of force and said polyolefin polymer being formed of monomer of from two through 16 carbons and containing in polymerized from an olefin monomer of 11 through 13 carbons in an amount greater than that of any other specific olefin of lower carbon content in said polymer.

2. An article of claim 1 in which said polyolefin polymer has an intrinsic viscosity of 1.7 through 5.0 in cyclohexane at 30° C.

3. An article of claim 2 in which said polyolefin polymer has an intrinsic viscosity of 2.0 through 3.5 in cyclohexane at 30° C. and a melting point of less than 50° C.

4. An article of claim 3 in which said article after heat activation is a pressure-sensitive adhesive sheet comprising a flexible backing having said heat-activated pressure-sensitive adhesive coating on at least one side thereof the polyolefin polymer of said pressure-sensitive adhesive coating having a soluble polymer content in equivolume mixture of heptane and acetone of not more than about 30 percent by weight of said polyolefin.

5. An article of claim 1 in which said olefin monomer of 11 through 13 carbons has a carbon chain length of 12 carbons.

6. An article of claim 1 in which said polyolefin polymer is a homopolymer having a general structure as expressed by the formula

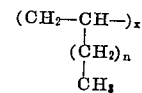

where $n$ is an integer of 8 through 10.

7. An article of claim 6 in which said homopolymer has an intrinsic viscosity of 1.7 through 5.0 in cyclohexane at 30° C.

8. An article of claim 7 in which said homopolymer has an intrinsic viscosity of 2.0 through 3.5 in cyclohexane at 30° C. and a melting point of less than 50° C.

9. An article of claim 8 in which said article is a heat-activatable pressure-sensitive adhesive sheet comprising a flexible backing having said heat-activatable pressure-sensitive adhesive polyolefin homopolymer coating on at least one side thereof the polyolefin homopolymer of said heat-activatable adhesive coating having soluble polymer content in an equivolume mixture of heptane and acetone of not more than about 30 percent by weight of the polyolefin homopolymer.

10. An article of claim 1 in which said polyolefin adhesive coating contains in polymerized form at least one olefin of carbon chain length within the range of two through 16 carbons but outside of the range of 11 through 13 carbons.

11. An article of claim 10 in which said polyolefin heat-activatable adhesive coating consists essentially of polymerized olefins of carbon chain length of two through 13 carbons.

12. An article of claim 10 in which said polyolefin adhesive coating consists essentially of polymerized olefins of carbon chain length of 11 through 16 carbons.

13. An article of claim 10 in which the polyolefin polymer of said polyolefin heat-activatable adhesive coating has an intrinsic viscosity of 1.7 through 5.0 in cyclohexane at 30° C.

14. An article of claim 13 in which said heat-activatable polyolefin polymer has an intrinsic viscosity of 2.0 through 3.5 in cyclohexane at 30° C. and a melting point of less than 50° C.

15. An article of claim 14 in which said article is a heat-activatable pressure-sensitive adhesive sheet comprising a flexible backing having said heat-activatable pressure-sensitive adhesive polyolefin polymer firmly adhered on at least one side thereof the polyolefin of said heat-activatable adhesive polymer having a soluble polymer content in an equivolume mixture of heptane and acetone of not more than about 30 percent by weight of the polyolefin.

16. An article of claim 10 in which said olefin of 11 through 13 carbons has a carbon chain length of 12 carbons.

* * * * *

PO-1050
(5/69)

UNITED STATES PATENT OFFICE
CERTIFICATE OF CORRECTION

Patent No. 3,635,754                                Dated January 18, 1972

Inventor(s) Charles H. Beede

It is certified that error appears in the above-identified patent and that said Letters Patent are hereby corrected as shown below:

Col. 1, line 4 - "21, 1966", second occurrence, should be omitted.

Col. 2, line 27 - the "+" should read - ° - (degree).

Col. 4, line 44 - "heptone" should read - heptane - .

Col. 5, line 56 - after 2.5, second occurrence, should read - mmoles - ; line 61, "moles" should read - mmoles -.

Col. 8, line 19 - "from" should read - form - .

Signed and sealed this 4th day of July 1972.

(SEAL)
Attest:

EDWARD M.FLETCHER,JR.
Attesting Officer

ROBERT GOTTSCHALK
Commissioner of Patents